(12) United States Patent  
Ohtsuki et al.

(10) Patent No.: US 8,918,408 B2
(45) Date of Patent: Dec. 23, 2014

(54) CANDIDATE GENERATION FOR PREDICTIVE INPUT USING INPUT HISTORY

(75) Inventors: Katsutoshi Ohtsuki, Tokyo (JP); Koji Watanabe, Tokyo (JP)

(73) Assignee: Microsoft Corporation, Redmond, WA (US)

( * ) Notice: Subject to any disclaimer, the term of this patent is extended or adjusted under 35 U.S.C. 154(b) by 305 days.

(21) Appl. No.: 13/593,525

(22) Filed: Aug. 24, 2012

(65) Prior Publication Data

US 2014/0059058 A1 Feb. 27, 2014

(51) Int. Cl.
*G06F 17/30* (2006.01)
*G06F 3/06* (2006.01)

(52) U.S. Cl.
CPC .... *G06F 17/30011* (2013.01); *G06F 17/30091* (2013.01); *G06F 17/30218* (2013.01); *G06F 3/0643* (2013.01)
USPC ........... 707/752; 707/602; 707/756; 707/753; 704/243; 704/254

(58) Field of Classification Search
CPC ................. G06F 17/30011; G06F 17/30091; G06F 17/30218; G06F 3/0643
USPC ........... 707/602, 753, 756, 752; 704/243, 254
See application file for complete search history.

(56) References Cited

U.S. PATENT DOCUMENTS 7,233,265 B2 * 6/2007 Cockburn et al. ............... 341/51
7,466,859 B2 12/2008 Chang et al.
7,809,719 B2 10/2010 Furuuchi et al.
7,904,808 B2 * 3/2011 Harada .......................... 715/255
7,912,700 B2 3/2011 Bower et al.
8,010,465 B2 8/2011 Badger et al.
2003/0177289 A1 * 9/2003 Wakatsuki et al. ............... 710/1
2005/0179569 A1 * 8/2005 Cockburn et al. ............... 341/51
2006/0143093 A1 6/2006 Brandt et al.
2008/0134025 A1 * 6/2008 Harada .......................... 715/255
2009/0193334 A1 7/2009 Assadollahi
2010/0250251 A1 * 9/2010 Ohtsuki et al. ................ 704/243
2011/0320464 A1 * 12/2011 Okato et al. .................. 707/751

FOREIGN PATENT DOCUMENTS

WO WO2014032265 A1 * 6/2014 ................ G06F 3/01

OTHER PUBLICATIONS

Ganslandt, et al., "Predictive Text Entry using Syntax and Semantics", Retrieved at <<http://aclweb.org/anthology-new/W/W09/W09-3806.pdf>>, Proceedings of the 11th International Conference on Parsing Technologies (IWPT), Oct. 2009, pp. 37-48.

(Continued)

*Primary Examiner* — Frantz Coby
(74) *Attorney, Agent, or Firm* — Timothy Churna; Leonard Smith; Micky Minhas

(57) ABSTRACT

A computing device maintains an input history in memory. This input history includes input strings that have been previously entered into the computing device. When the user begins entering characters of an input string, a predictive input engine is activated. The predictive input engine receives the input string and the input history to generate a candidate list of predictive inputs which are presented to the user. The user can select one of the inputs from the list, or otherwise continue entering characters. The computing device generates the candidate list by combining frequency and recency information of the matching strings from the input history. Additionally, the candidate list can be manipulated to present a variety of candidates. By using a combination of frequency, recency and variety, a favorable user experience is provided.

20 Claims, 4 Drawing Sheets

(56) References Cited

OTHER PUBLICATIONS

Komatsu, et al., "Corpus-based Predictive Text Input", Retrieved at <<http://www.pitecan.com/papers/AMT2005/AMT2005.pdf>>, Active Media Technology, 2005. (AMT 2005). Proceedings of the 2005 International Conference, May 19-21, 2005, pp. 75-80.

Elumeze, et al., "Intelligent Predictive Text Input System using Japanese Language", Retrieved at <<http://nwanua.aniomagic.com/papers/nlp_elumeze_nishimoto.pdf>>, Proceedings: IEEE Workshop on Motion and Video Computing, 2007, pp. 7.

* cited by examiner

CANDIDATE GENERATION FOR PREDICTIVE INPUT USING INPUT HISTORY

BACKGROUND

With most computing devices and applications, it is desirable to try to reduce the amount of manual input from a user. One way to reduce manual input is to provide a user interface that displays words, phrases or other input strings that the computing device predicts a user is trying to enter. User input can be received, for example, through a soft keyboard on a touch screen of a mobile device, through a hardware keyboard or similar input device, or natural user interface such as a speech recognition engine. As the user input is received, a predictive input engine can generate candidate words and phrases or other strings for selection by the user. The user can select a candidate word or phrase instead of completing or correcting an entered string.

Applications such as electronic mail, search interfaces, word processing and the like can provide such a predictive input interface. On mobile devices, with touch keyboards or hardware keyboards, such prediction allows a user to enter input quickly. On desktop devices, such prediction can improve user productivity.

It can be a challenge to provide a satisfactory user experience using predictive inputs. Some predictive input engines present a list of candidates that are sorted based on frequency of use of the input string in an input history. Some predictive input engines also present multiple phrases that begin with the input string. These techniques often do not provide a reliably acceptable user experience. In some cases, the most frequent terms in the input history are not a good prediction of user intent. In some cases, multiple similar, yet undesired, terms are presented to a user. Instead of improving productivity, such predictive inputs can be distracting or reduce productivity.

SUMMARY

This Summary is provided to introduce a selection of concepts in a simplified form that are further described below in the Detailed Description. This Summary is intended neither to identify key or essential features of the claimed subject matter, nor to limit the scope of the claimed subject matter.

A computing device maintains an input history in memory. This input history includes input strings that the user previously entered into the computing device. When the user begins entering characters of an input string, a predictive input engine is activated. The predictive input engine receives the input string and the input history to generate a candidate list of predictive inputs which are presented to the user. The user can select one of the inputs from the list, or otherwise continue entering characters.

The computing device generates the candidate list by combining frequency and recency information of the matching strings from the input history. Additionally, the candidate list can be manipulated to present a variety of candidates. By using a combination of frequency, recency and variety, a favorable user experience is provided.

The predictive input engine can generate a candidate list in a variety of ways using frequency and recency information, and by injecting variety. In one example implementation, an input string is matched to strings in an input history. The most recent and frequent matching strings from the input history are selected as a list of candidate strings. This list of candidate strings is then sorted by their recency in the input history. To provide variety, this list can be further altered so as to present dissimilar words and phrases at the top of the list.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DESCRIPTION OF THE DRAWINGS

FIG. 2 is a data flow diagram illustrating an example implementation of.

DETAILED DESCRIPTION

The following section provides an example operating environment in which a predictive input engine can be implemented.

Figure 1:
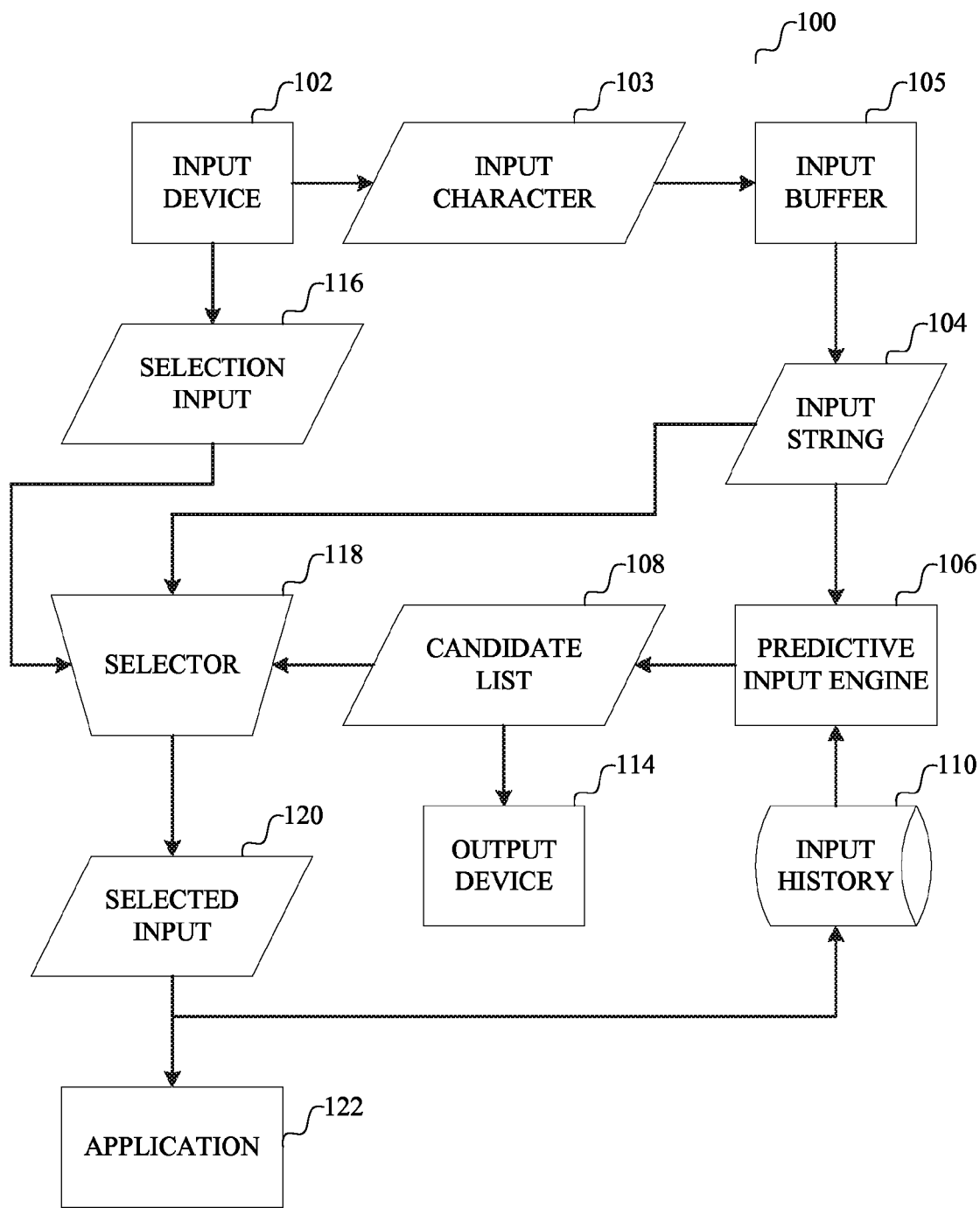
FIG. 1 is a block diagram of an example computing environment using a predictive input engine.

Referring to FIG. 1, a computing device 100 includes an input device 102 through which a user can input characters 103 of an input string 104. As an example, the computing device can be a mobile phone, personal computer or the like. The input device can be, for example, a standard alphanumeric keyboard, a keyboard displayed on a touchscreen, or other device or combination of devices allowing a user to enter one or more characters to provide an input string. As characters are entered, they are added to an input buffer 105 that stores the input string 104. The input string is applied to a predictive input engine 106, which uses an input history 110 to generate, and to provide as an output, a candidate list 108. An example implementation of the predictive input engine is described in more detail below.

The candidate list is presented to the user through an output device 114, such as a display. The user can select a word or phrase from the candidate list, or continuing entering characters, adding to the input string 104. If more characters are entered, the predictive input engine can generate another candidate list. When the user provides an input 116 to a selector 118, providing an indication of either completion of the word or phrase being entered or a selection of a word or phrase from the candidate list, the selected input 120 is provided to an application 122 and can be added to the input history 110. When added to the input history, a time stamp or other suitable data can be associated with the input string to allow recency to be determined.

The input history can be maintained for each application, for a user across multiple applications on a computer, or for a group of users, or for a user across multiple computing devices. The input history can be stored in remote storage with other setting related to a user that allows the input history to be shared among multiple computing devices used by the user. The input history is a sequence of selected strings, and generally includes, for each selected input string, various information such as, a display representation of the input string, its part of speech, a phonetic representation of the string, a time stamp of when the input string was entered, the application for which the input string was intended, and phrase boundary information. In some cases, such as Japanese, the phonetic representation of the string can be input by a user and can be used by the system to search the input history; there can be many matching input strings that match the phonetic representation but have different display representations, from which a user can select. Matching can be performed on the display representation or the phonetic representation, depending on the format of the input string. If an input string occurs several times in the input history, then the information is stored for each use; the frequency of occurrence, count of a number of times the input string occurs in the input history, can be determined when the predictive inputs are generated for an application. This frequency of occurrence can be determined overall for a system or per application.

The predictive input engine 106, an example of which is described in more detail below, uses the input history 110 to provide the candidate list 108 to the user, balancing the use of input frequency, input recency and variety to create the candidate list. For example, the resulting candidate list that is presented to a user includes most recently used words that match the input string and frequently used long phrases that include the input string, while ensuring that candidate strings presented at the top of the list are dissimilar. Such a predictive input engine can be a service provided by an operating system across multiple applications, or can be part of a standalone application.

Given this context, an example implementation of the predictive input engine will now be described in more detail in connection with FIGS. 2-4.

Figure 2:
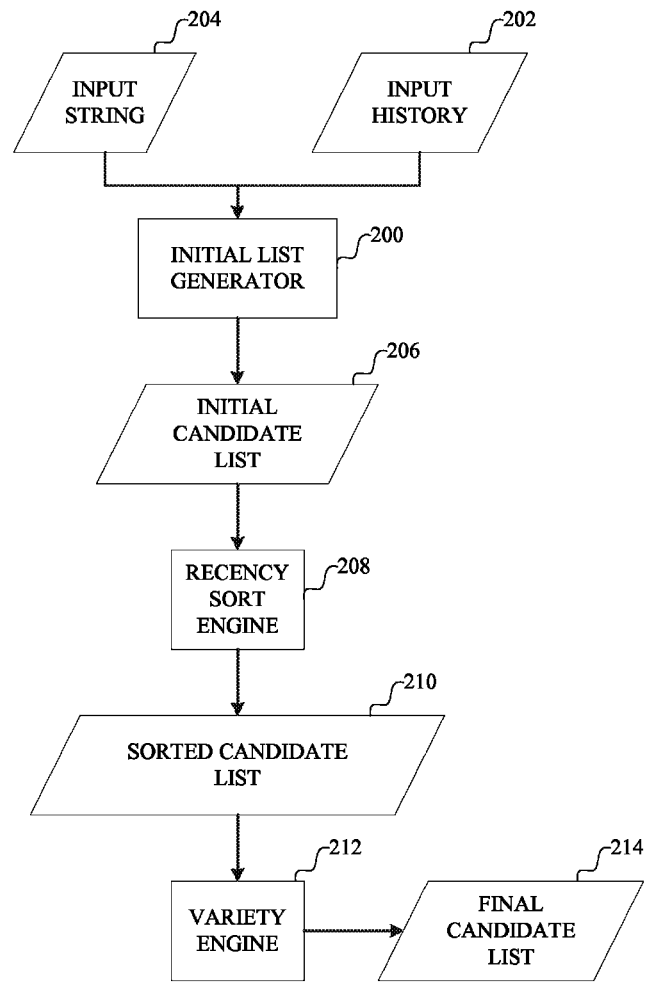
Figure 3:
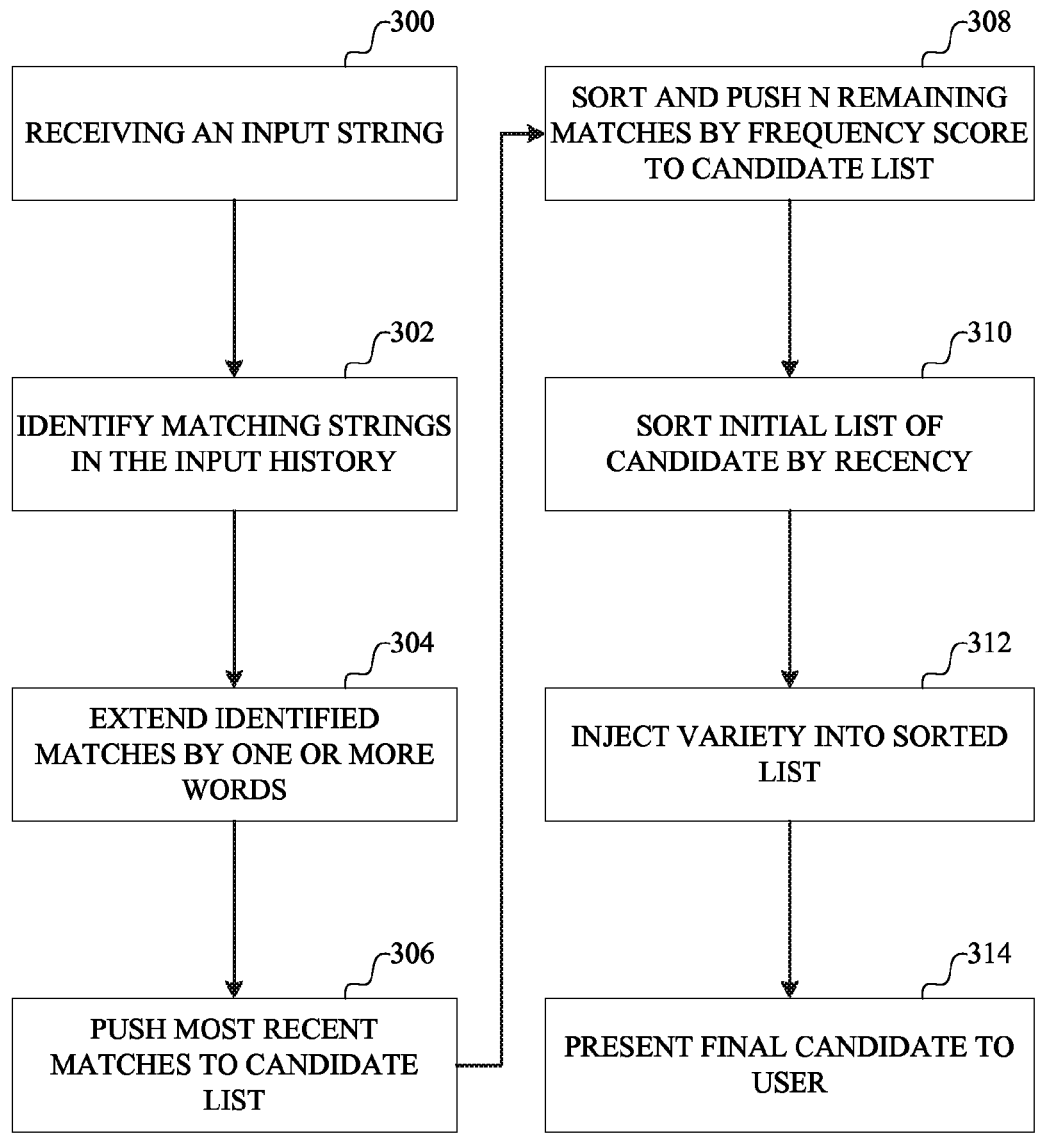
FIG. 3 is a flow chart describing operation of the example implementation of the system of FIG. 2.

FIG. 2 is a more detailed data flow diagram of an example implementation of the predictive input engine. In this implementation, the predictive input engine includes an initial list generator 200 that receives the input history 202 as one input and an input string 204 as another input. The initial list generator generates an initial candidate list 206.

The initial candidate list can be generated in many ways. In one implementation, the initial list generator identifies strings of characters in the input history 202 that match the input string 204. The matching can be implemented a number of different ways, and the invention is not limited by the kind of matching performed.

For example, the matching can identify strings in the input history that have a prefix that exactly matches the input string. The matching can be case sensitive or case insensitive. The matching also can identify strings in the input history that have a prefix that closely matches the input string. Additional words can be added to matching input strings to create matching sequences of words, and those word sequences also can be added to the list of matching strings.

The initial list generator then selects strings from the list of matching strings and places them in the initial candidate list. For example, the top M most recently occurring matching strings from the input history, where M is a positive integer, also can be selected and added to the initial candidate list. Using recently occurring matching strings ensures that the initial candidate list includes recent inputs even if they are not frequent. A small number, such as 1, 2, 3, 4, or 5, is used for M. As another example, the top N most frequently occurring matching strings from the input history, where N is a positive integer, can be selected and added to the initial candidate list. Suitable values for N can be in the range, for example, 5 to 20. If the number of desired candidates shown to the user is about ten (10), then a reasonable value for N is 20. The top N most frequently occurring matching strings can be determined using frequency alone or using a candidate scoring function that is a function of frequency. An example frequency-based candidate scoring function provides a score (S) that is the product of frequency (F) and length (L), in either characters or words, of the input string, i.e., $S=F*L$.

Given the initial candidate list, it is sorted by recency. For example, a recency-based sort engine 208 receives the initial candidate list 206 and sorts its entries by recency of occurrence in the input history, thus providing a sorted candidate list 210. If two strings have the same recency value, then the string with the higher frequency value can be ranked first. As a result, the most recently used strings from among the most frequently used strings from the input history appear at the beginning of the sorted candidate list 210.

The sorted candidate list 210 optionally can be provided to a variety engine 212 which ensures that the top elements in the sorted candidate list exhibit some variety. In other words, the sorted candidate list is altered so that similar strings are not grouped together at the top of the list; or, the strings at the beginning of the list are dissimilar. The final candidate list 214 is then provided as the output of the predictive input engine.

There are several ways to implement the variety engine. For example, in one implementation, the first string in the sorted candidate list is put into a first temporary output list. Each string in the sorted candidate list is then examined in turn. If the next string includes a substring from the left of any strings in the first temporary output list, that next string is put into a second temporary output list. As an illustrative example, if the sorted candidate list is the following set of strings {A, AB, ABC, G, GH, GJ, KL, K, KLM, KLMN}, then the first temporary output list will become {A, G, KL} and the second temporarily output list will become {AB, ABC, GH, GJ, K, KLM, KLMN}. The second temporary output list is concatenated to the end of the first temporary output list to provide a final candidate list, which will be {A, G, KL, AB, ABC, GH, GJ, K, KLM, KLMN}.

A flowchart describing an example implementation of the prediction engine will now be described in connection with FIG. 3.

In this implementation, upon receiving 300 an input string, prefix-matched words and word sequences, or other strings, from the input history are identified 302. The set of identified prefix-matched words and word sequences is extended 304 by extending each match by one or more words. The most recent words or word sequences from the list are then pushed 306 to an initial list of candidates. The remaining words and word sequences are sorted 308 by frequency score, with the top N entries being pushed to the initial list of candidates.

The initial list of candidates is sorted 310 by recency and stored in a temporary list. The temporary list is then manipulated 312 to inject some variety, i.e., to ensure that the first few elements of the list are dissimilar. The resulting list is the final candidate list that can be presented 314 to the user.

Having now described an example implementation, a computing environment in which such a system is designed to operate will now be described. The following description is intended to provide a brief, general description of a suitable computing environment in which this system can be implemented. The system can be implemented with numerous general purpose or special purpose computing hardware configurations. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 4:
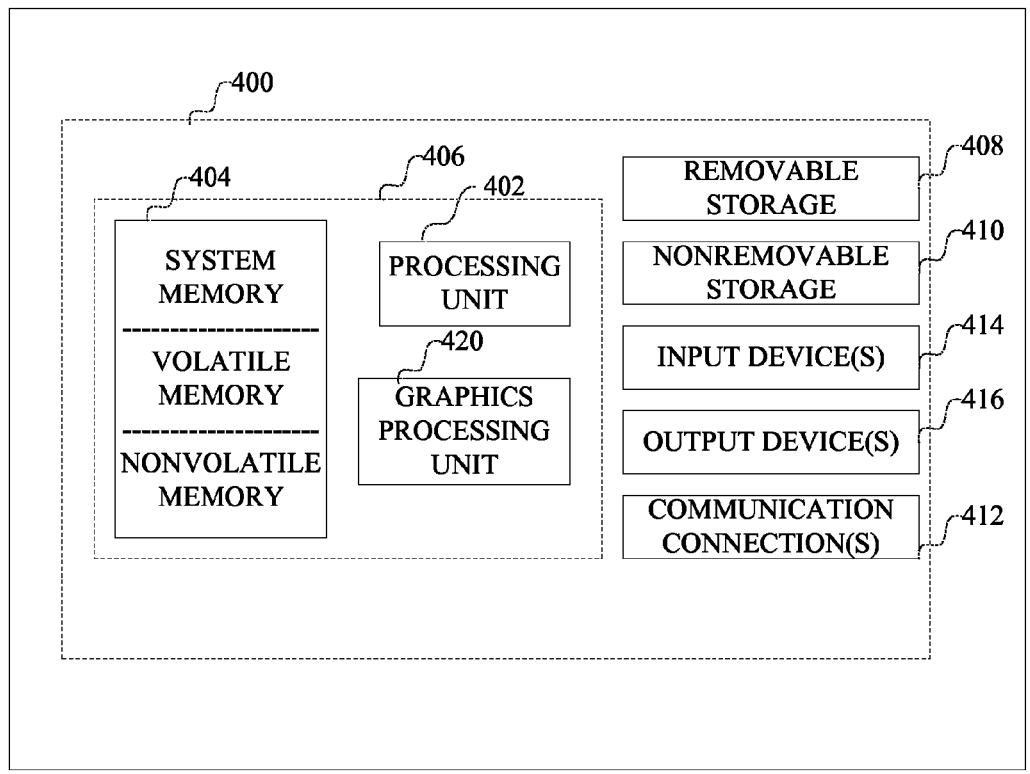
FIG. 4 is a block diagram of an example computing device in which such a system can be implemented.

FIG. 4 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 4, an example computing environment includes a computing machine, such as computing machine 400. In its most basic configuration, computing machine 400 typically includes at least one processing unit 402 and memory 404. The computing device may include multiple processing units and/or additional co-processing units such as graphics processing unit 420. Depending on the exact configuration and type of computing device, memory 404 may be volatile (such as RAM), non-volatile (such as ROM, flash memory, etc.) or some combination of the two. This most basic configuration is illustrated in FIG. 4 by dashed line 406. Additionally, computing machine 400 may also have additional features/functionality. For example, computing machine 400 may also include additional storage (removable and/or non-removable) including, but not limited to, magnetic or optical disks or tape. Such additional storage is illustrated in FIG. 4 by removable storage 408 and non-removable storage 410. Computer storage media includes volatile and nonvolatile, removable and non-removable media implemented in any method or technology for storage of information such as computer program instructions, data structures, program modules or other data. Memory 404, removable storage 408 and non-removable storage 410 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing machine 400. Any such computer storage media may be part of computing machine 400.

Computing machine 400 may also contain communications connection(s) 412 that allow the device to communicate with other devices. Communications connection(s) 412 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Computing machine 400 may have various input device(s) 414 such as a keyboard, mouse, pen, camera, touch input device, and so on. Output device(s) 416 such as a display, speakers, a printer, and so on, may also be included. All of these devices are well known in the art and need not be discussed at length here. The input and output devices can be part of a natural user interface (NUI). NUI may be defined as any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence. Example categories of NUI technologies include, but are not limited to, touch sensitive displays, voice and speech recognition, intention and goal understanding, motion gesture detection using depth cameras (such as stereoscopic camera systems, infrared camera systems, rgb camera systems and combinations of these), motion gesture detection using accelerometers, gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods).

The predictive input engine may be implemented in the general context of software, including computer-executable instructions and/or computer-interpreted instructions, such as program modules, being processed by a computing machine. Generally, program modules include routines, programs, objects, components, data structures, and so on, that, when processed by a processing unit, instruct the processing unit to perform particular tasks or implement particular abstract data types. This system may be practiced in distributed computing environments where tasks are performed by remote processing devices that are linked through a communications network. In a distributed computing environment, program modules may be located in both local and remote computer storage media including memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer-implemented process comprising:
receiving an input string of characters into memory;
accessing an input history, the input history comprising a plurality of strings of characters previously used and stored in memory,
using a processor, generating in memory an initial list of candidate strings, the candidate strings being strings in the input history having a prefix that matches the input string;
selecting, using a processor, M most recent candidate strings and N most frequent candidate strings from the initial list of candidate strings, to create a secondary list of candidate strings;

sorting, with a processor, the secondary list of candidate strings by recency in the input history to provide a sorted list of candidate strings;

altering the sorted list of candidate strings to provide a final list of candidate strings, such that strings are dissimilar in a set of strings at a beginning of the final list of candidate strings; and presenting the final list of candidate strings for selection in place of the input string.

2. The computer-implemented process of claim 1, further comprising providing one of the input string and a selected string from the list of candidate strings as an input to an application.

3. The computer-implemented process of claim 1, receiving into memory an indication of a selection from the final list of candidate strings.

4. The computer-implemented process of claim 1, wherein altering comprises:

searching the sorted list of candidate strings to identify a first occurrence of each prefix;

placing the first occurrence of each prefix in a first list;

placing any subsequent occurrence of the prefix in a second list; and appending the second list to the end of the first list after completing searching of the sorted list.

5. The computer-implemented process of claim 1, wherein generating the initial list of candidate string comprises:

identifying matching strings in the input history; and appending words to the matching strings to make word sequences.

6. The computer-implemented process of claim 1, wherein selecting candidate strings based on frequency includes computing a score for each matching string based on frequency and length of the matching string.

7. An article of manufacture comprising:

a computer storage medium;

computer program instructions stored on the computer storage medium which, when processed by a processing device, instruct the processing device to perform a process comprising:

receiving an input string of characters into memory;

accessing an input history, the input history comprising a plurality of strings of characters previously used and stored in memory, generating in memory an initial list of candidate strings, the candidate strings being strings in the input history having a prefix that matches the input string;

selecting M most recent candidate strings and N most frequent candidate strings from the initial list of candidate strings, to create a secondary list of candidate strings;

sorting the secondary list of candidate strings by recency in the input history to provide a sorted list of candidate strings;

altering the sorted list of candidate strings to provide a final list of candidate strings, such that strings are dissimilar in a set of strings at a beginning of the final list of candidate strings; and presenting the final list of candidate strings for selection in place of the input string.

8. The article of manufacture of claim 7, further comprising providing one of the input string and a selected string from the list of candidate strings as an input to an application.

9. The article of manufacture of claim 7, receiving into memory an indication of a selection from the final list of candidate strings.

10. The article of manufacture of claim 7, wherein altering comprises:

searching the sorted list of candidate strings to identify a first occurrence of each prefix;

placing the first occurrence of each prefix in a first list;

placing any subsequent occurrence of the prefix in a second list; and appending the second list to the end of the first list after completing searching of the sorted list.

11. The article of manufacture of claim 7, wherein generating the initial list of candidate string comprises:

identifying matching strings in the input history; and appending words to the matching strings to make word sequences.

12. The article of manufacture of claim 7, wherein selecting candidate strings based on frequency includes computing a score for each matching string based on frequency and length of the matching string.

13. A computing machine comprising:

a memory for receiving an input string through an input device;

a predictive input engine having an input for receiving the input string and an input for receiving an input history, and an output providing a list of candidate strings from the input history that match the input string, wherein the predictive input engine selects matching strings by both recency and frequency, and sorts the selected matching strings by recency and selects dissimilar strings to present at the top of the sorted list of candidate strings; and a selector allowing the user to select a string from the list of candidate strings to provide as an input to an application.

14. The computing machine of claim 13, wherein the selector has an input for receiving an indication of a selection from the final list of candidate strings.

15. The computing machine of claim 13, wherein the predictive input engine searches the sorted list of candidate strings to identify a first occurrence of each prefix, places the first occurrence of each prefix in a first list, places any subsequent occurrence of the prefix in a second list, and appends the second list to the end of the first list after completing searching of the sorted list so as to provide the list of candidate strings.

16. The computing machine of claim 13, wherein the predictive input engine identifies matching strings in the input history and appends words to the matching strings to make word sequences before selecting from the matching strings.

17. The computing machine of claim 13, wherein the predictive input engine selects candidate strings based on frequency by computing a score for each matching string based on frequency and length of the matching string.

18. The computing machine of claim 13, wherein the input history includes data about input strings including when the input string was most recently input and a number of times the input string has been input.

19. The computing machine of claim 13, wherein the input device is a touch screen that displays a keyboard to a user.

20. The computing machine of claim 13, wherein the input device is a keyboard.

* * * * *